2,822,382
Patented Feb. 4, 1958

2,822,382

COMPOUNDS OF THE PERHYDROCHRYSENE SERIES AND PREPARATION THEREOF

Raymond O. Clinton, North Greenbush, N. Y., assignor to Sterling Drug Inc., New York, N. Y., a corporation of Delaware No Drawing. Application December 16, 1954
Serial No. 475,810

25 Claims. (Cl. 260—488)

This invention relates to new compounds of the perhydrochrysene series (D-homosteroids) and to processes for their preparation. More particularly the invention relates to compounds having the formula

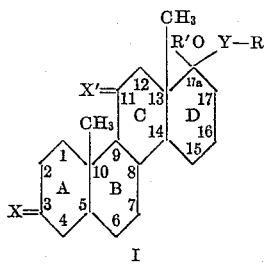

I wherein Y is a two carbon hydrocarbon radical with the free valences on different carbon atoms, R is selected from the class consisting of hydrogen, lower-alkyl, and R'O-lower-alkyl, R' is selected from the class consisting of hydrogen, lower-alkanoyl, carboxy-lower-alkanoyl and monocarbocyclic aroyl radicals, and X and X' are selected from the class consisting of

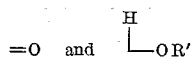

In the above general Formula I the two carbon hydrocarbon radical Y represents a class comprising three specific groupings, namely, the ethylene group, —$CH_2CH_2$—, the vinylene group, —$CH=CH$—, and the ethynylene group, —$C\equiv C$—.

When R in the above formula is hydrogen, the combined grouping —Y—R can be an ethyl, vinyl or ethynyl group. When other than hydrogen, R is a lower-alkyl, hydroxy-lower-alkyl or an acyloxy-lower-alkyl group having from one to about eight carbon atoms, including such groups as methyl, ethyl, propyl, isopropyl, butyl, isobutyl, hydroxymethyl, 2-hydroxyethyl, 1-hydroxyisopropyl, 3-hydroxybutyl, 2-acetoxyethyl, 4-acetoxybutyl, propionoxymethyl, butyroxyethyl, benzoyloxymethyl, and the like.

In compounds of Formula I where X, X' or OR' is O-acyl, the nature of the acyl group is not critical as it is used only as a blocking or protecting means for the hydroxy group. The preferred types of acyl groups are those derived from lower fatty acids, including lower-alkanoic acids, lower-aliphatic dicarboxylic acids and monocarbocyclic aromatic carboxylic acids, optionally substituted by one or more inert groups such as nitro, alkyl, alkoxy and halogen. Thus R' in the above definition can be lower-alkanoyl, such as formyl, acetyl, propionyl, butyryl, valeryl, isovaleryl, caproyl, etc. wherein the alkanoyl group has from one to about six carbon atoms; carboxy-lower-alkanoyl, such as malonyl and succinyl; and monocarbocyclic aroyl, such as benzoyl, p-toluyl, and p-nitrobenzoyl. The foregoing also applies to the acyl group of R when R represents an acyloxy-lower-alkyl group. When more than one acyl group is present in the molecule these groups can be the same or different acyl groups.

In the compounds the R'O group at $C_{17a}$ can be in the α-configuration and the aliphatic group at $C_{17a}$ can be in the β-configuration, or vice versa. Acyloxy or hydroxy groups at $C_3$ and $C_{11}$ can also be in either the α- or β-configuration.

The compounds of my invention are prepared from intermediates having the formula

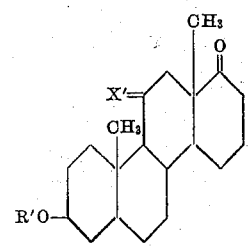

wherein X' and R' have the meanings given hereinabove. These intermediates are prepared as described in my copending U. S. application, Serial No. 333,615, filed January 27, 1953, now abandoned. In preparing the compounds of the present invention, the aforesaid intermediates are reacted under anhydrous conditions with an alkali metal derivative of acetylene or a substituted acetylene, or an acetylenic Grignard reagent, $RC\equiv CM$, where M is an alkali metal or halomagnesium, and R has the meaning given above. The organometallic reagent is most conveniently prepared in situ by passing acetylene gas into or adding a substituted acetylene to a reaction mixture containing a strong base derived from an alkali metal, or an alkyl Grignard reagent. The strong base is one powerful enough to replace an alkyne hydrogen atom with an alkali metal, and includes such bases as sodium amide, potassium amide and certain alkoxides such as potassium tertiary-butoxide, lithium tertiary-butoxide and potassium tertiary-amyloxide. In the case where R is a hydroxyalkyl group, the hydroxyl hydrogen atom is also replaced by an alkali metal during the reaction, but the free hydroxyl group is regenerated in the subsequent hydrolysis. After reaction of the 17a-keto-D-homosteroid with a metal acetylide and hydrolysis of the intermediate organometallic compound there is produced a compound having the formula

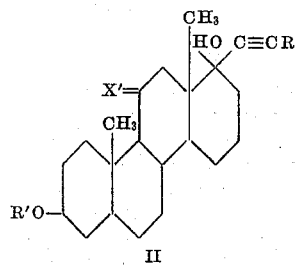

II

Usually both possible stereoisomers involving the asymmetric carbon atom at position 17a are produced in the reaction with one isomer predominating. The grouping at position 11, X', can be a hydroxy, acyloxy or keto group. An 11-keto group is relatively inert and will not react with a metal acetylide. The grouping at position 3, R'O, can be hydroxy or acyloxy but not a keto group, since a keto group in this position will react with a metal acetylide. If it is desired to prepare compounds of my invention containing a keto group in the 3-position, they can be produced by oxidizing the corresponding 3-hydroxy compounds by means of oxidizing agents which will not alter the side chain at the 17a-position. A useful oxidizing agent for this purpose is aluminum isopropoxide in the presence of a low molecular weight ketone (Oppenauer method). Chromic oxide under mild conditions can also be used to oxidize a 3-hydroxy to a 3-keto group when the group at position 17a is alkyl or alkenyl.

The compounds of the invention where the bridge Y at the 17a-position (Formula I) is vinylene or ethylene are prepared by reduction of the corresponding compounds where Y is ethynylene. Selective hydrogenation of the ethynylene group to a vinylene group can be accomplished by chemical means, for example, with sodium in alcohol, or by mild catalytic hydrogenation. Supported palladium catalysts are particularly useful for this purpose. Reduction of the vinylene group to the ethylene group or overall reduction of the ethynylene group to the ethylene group can be accomplished by catalytic hydrogenation using a nickel or platinum catalyst. Platinum oxide is a preferred catalyst since it brings about hydrogenation at room temperature and moderate pressure.

The compounds wherein Y is ethylene can also be prepared directly from the intermediate D-homoetiocholan-17a-ones by reacting the latter with a Grignard reagent RYMgX, R being hydrogen, lower-alkyl or acyloxy-lower-alkyl, and X being halogen.

Hydroxy groups present in compounds of Formula I can be readily acylated to prepare any desired ester by reacting the free hydroxy compound with an acid, acid anhydride or acid halide according to conventional procedures as described in the examples below.

The compounds within the scope of Formula I are to a large degree mutually interconvertible. For example, the compounds wherein Y is ethynylene (—C≡C—) are starting materials in the preparation of the compounds wherein Y is vinylene (—CH=CH—) and ethylene (—CH$_2$—CH$_2$—). Compounds wherein R' is hydrogen can be converted to compounds wherein R' is acyl by esterification procedures, and the reverse conversion is effected by saponification procedures. Hydroxy or keto groups at positions 3 and 11 can be readily interconverted by conventional methods known to oxidize cycloaliphatic hydroxy groups to keto groups, e. g., with hexavalent chromium, N-bromoamides, aluminum alkoxides (Oppenauer method), etc.; or to reduce cycloaliphatic keto groups to hydroxy groups, e. g., with lithium aluminum hydride, sodium borohydride, sodium in alcohol, the Meerwein-Ponndorf-Verley method, etc. Selective interconversion of keto and hydroxy groups can often be effected by taking advantage of the different reactivities of these groups in the 3- and 11-positions, or by protecting one group by means of acylation in the case of hydroxy groups or ketal formation in the case of keto groups.

The following examples will further illustrate the invention.

EXAMPLE 1

17aα - ethynyl - D - homoetiocholane - 3α,17aβ - diol - 11-one (II; R is H, X' is O, R' is H):

Potassium metal (2.6 g., 0.065 mole) was added to 70 ml. of tertiary-butyl alcohol (previously dried over calcium hydride and distilled) under anhydrous conditions with stirring in a nitrogen atmosphere. Complete reaction of the potassium was effected by refluxing the mixture for four hours. The solution was then cooled, and 3.18 g., of D-homoetiocholan-3α-ol-11,17a-dione dissolved in 50 ml. of anhydrous tertiary-butyl alcohol was added. A slow stream of acetylene (purified by passage through a train comprising a trap immersed in a Dry Ice-methylene dichloride mixture, a bottle containing concentrated sulfuric acid, and a soda lime tower) was passed through the solution for eight hours at a rate of about two bubbles per second. The reaction mixture was then allowed to stand for about fifteen hours. After acetylene was passed in for two hours longer, the reaction mixture was poured into 600 ml. of water, and the hydrolysis mixture was acidified with dilute hydrochloric acid and then neutralized with sodium bicarbonate. The aqueous mixture was concentrated to a 200 ml. volume, diluted with ice water to 600 ml., and the solid product was collected by filtration, washed with water and dried at 70° C., giving 2.94 g. (85.5%) of 17aα-ethynyl-D-homoetiocholane-3α,17aβ-diol-11-one (D-homo-20-pregnyne-3α,17aβ-diol-11-one), M. P. 205–210° C. Recrystallization of a sample from an ethyl acetate-petroleum ether (Skellysolve B) mixture and then from ethyl acetate alone gave the pure substance with M. P. 220.5–228° C., [α]$_D^{25}$=+5.0° (1% in chloroform).

Analysis.—Calcd. for C$_{22}$H$_{32}$O$_3$: C, 76.70; H, 9.36. Found: C, 76.43; H, 9.59.

17aα - ethynyl - D - homoetiocholane - 3α,17aβ - diol - 11-one reacts with butyric anhydride, succinic anhydride or benzoyl chloride, each in pyridine, to give, respectively, 3α - butyryloxy - 17aα - ethynyl - D - homoetiocholan - 17aβ - ol - 11 - one, 3α - (β - carboxy - propionoxy) - 17aα - ethynyl - D - homoetiocholan - 17aβ - ol - 11 - one, or 3α - benzoyloxy - 17aα - ethynyl - D - homoetiocholan - 17aβ - ol - 11 - one.

EXAMPLE 2

3α - acetoxy - 17aα - ethynyl - D - homoetiocholan - 17aβ - ol - 11 - one (II; R is H, X' is O, R' is CH$_3$CO—):

A mixture of 500 mg. of 17aα - ethynyl - D - homoetiocholane - 3α,17aβ - diol - 11 - one, prepared as described above in Example 1, 2.0 ml. of 90–95% acetic anhydride and 5.0 ml. of anhydrous pyridine was allowed to stand at room temperature for twenty hours. The reaction mixture was then added to 250 ml. of water containing 2 ml. of concentrated sulfuric acid. The aqueous mixture was allowed to stand for two hours, and the solid product was collected by filtration, washed with water, dried and recrystallized first from petroleum ether (Skellysolve B) containing a small amount of ethyl acetate and then from petroleum ether (Skellysolve C) and dried at 100° C. in a vacuum oven for eight hours, giving 3α-acetoxy-17aα-ethynyl - D - homoetiocholan - 17aβ - ol - 11 - one (3α - acetoxy - D - homo - 20 - pregnyn - 17aβ - ol - 11 - one), M. P. 202–207° C.,[α]$_D^{25}$=+28.9° (0.904% in chloroform).

EXAMPLE 3

3α - acetoxy - 17aβ - ethynyl - D - homoetiocholan - 17aα - ol - 11 - one:

By fractional crystallization of the material from the mother liquors from the recrystallization of 17aα-ethynyl-D-homoetiocholane-3α,17aβ-diol-11-one, prepared as described above in Example 1, followed by acetylation with acetic anhydride and pyridine and repeated chromatographic separation of the resulting material, it was possible to isolate a stereoisomer, namely, 3α - acetoxy - 17aβ - ethynyl - D - homoetiocholan - 17aα - ol - 11 - one, M. P. 189–190.5° C., [α]$_D^{25}$=+68.5° (1% in chloroform). This compound differs from the compound prepared in Example 2 in the configuration of the groups in the 17a-position.

Analysis.—Calcd. for C$_{24}$H$_{34}$O$_4$: C, 74.56; H, 8.87. Found: C, 74.61; H, 8.95.

EXAMPLE 4

17aβ - ethynyl - D - homoetiocholane - 3α,17aα - diol - 11 - one:

A solution of 700 mg. of potassium carbonate in 3 ml. of water was added to a solution of 300 mg. of 3α-acetoxy-17aβ - ethynyl - D - homoetiocholan - 17aα - ol - 11 - one obtained in Example 3 above in 15 ml. of methanol, and the mixture was refluxed for one hour, then made faintly acid to phenolphthalein with dilute hydrochloric acid and diluted with 150 ml. of water. The solid product was collected by filtration, dried, and recrystallized from ethyl acetate giving 17aβ - ethynyl - D - homoetiocholane - 3α,17aα - diol - 11 - one, M. P. 260.5–266° C., [α]$_D^{25}$=+62.2° (1% in acetic acid). This compound differs from the compound prepared in Example 1 in the configuration of the groups in the 17a-position.

*Analysis.*—Calcd. for $C_{22}H_{32}O_3$: C, 76.70; H, 9.36. Found: C, 76.80; H, 9.06.

EXAMPLE 5

*17aα - vinyl - D - homoetiocholane - 3α,17aβ - diol - 11 - one* (I; R is H, Y is —CH=CH—, X is

X' is O):

A mixture of 3.44 g. of 17aα - ethynyl - D - homoetiocholane - 3α,17aβ - diol - 11 - one, obtained as described above in Example 1, 0.75 g. of 2% palladium hydroxide on strontium carbonate catalyst and 150 ml. of pyridine was shaken in a hydrogen atmosphere at a pressure of 45 lbs. per sq. inch. Reduction was complete after about forty minutes. The catalyst was removed by filtration, the filtrate was concentrated, 75 ml. of ethyl acetate was added to the residue, and the solution obtained by warming was filtered to remove residual palladium. The filtrate was concentrated to a 20 ml. volume and then diluted with 60 ml. of petroleum ether (Skellysolve B). The crystalline product (3.38 g.) was obtained in two crops. The first crop (3.23 g.) was recrystallized from 50 ml. of ethyl acetate and dried at 110° C. for eight hours in a vacuum oven, giving 17aα - vinyl - D - homoetiocholane - 3α,17aβ - diol - 11 - one (D - homo - 20 - pregnene - 3α, 17aβ - diol - 11 - one), M. P. 203–206° C., $[\alpha]_D^{25}=+33.0°$ (1% in chloroform).

*Analysis.*—Calcd. for $C_{22}H_{34}O_3$: C, 76.25; H, 9.89. Found: C, 76.21; H, 10.11.

EXAMPLE 6

*3α - acetoxy - 17aα - vinyl - D - homoetiocholan - 17aβ - ol - 11 - one* (I; R is H, Y is —CH=CH—, X is

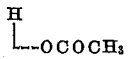

X' is O) was prepared from 500 mg. of 17aα - vinyl - D - homoetiocholane - 3α,17aβ - diol - 11 - one, prepared as described above in Example 5, 2.0 ml. of 90–95% acetic anhydride and 5.0 ml. of pyridine according to the manipulative procedure described above in Example 2. The product was recrystallized twice from an ethyl acetate-petroleum ether (Skellysolve B) mixture and dried for eight hours at 100° C. in a vacuum oven, giving 3α-acetoxy - 17aα - vinyl - D - homoetiocholan - 17aβ - ol - 11 - one (3α - acetoxy - D - homo - 20 - pregnen - 17aβ - ol - 11 - one), M. P. 219–221° C., $[\alpha]_D^{26}=+61.7°$ (1% in chloroform).

*Analysis.*—Calcd. for $C_{24}H_{36}O_4$: C, 74.19; H, 9.34. Found: C, 74.24; H, 9.92.

Substitution of the acetic anhydride in the procedure just described by p-nitrobenzoyl chloride gives 3α - (p - nitrobenzoyl) - 17aα - vinyl - D - homoetiocholan - 17aβ - ol - 11 - one (I; R is H, Y is —CH=CH—, X is

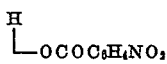

X' is O).

EXAMPLE 7

*3α - acetoxy - 17aβ - vinyl - D - homoetiocholan - 17aα - ol - 11 - one:*

By the manipulative procedure described in Example 5, 3.2 g. of 3α - acetoxy - 17aβ - ethynyl - D - homoetiocholan - 17aα - ol - 11 - one, prepared as described above in Example 3, was hydrogenated in 150 ml. of pyridine using 0.8 g. of 2% palladium hydroxide on strontium carbonate catalyst. The product was recrystallized twice from ethyl acetate and dried at 100° C. in a vacuum oven for eight hours, giving 3α - acetoxy - 17aβ - vinyl - D - homoetiocholan - 17aα - ol - 11 - one, M. P. 200.5–202.5° C., $[\alpha]_D^{25}=+33.45°$ (1% in chloroform). This compound differs from the compound prepared in Example 6 in the configuration of the groups in the 17a-position.

*Analysis.*—Calcd. for $C_{24}H_{36}O_4$: C, 74.19; H, 9.34. Found: C, 74.01; H, 8.90.

EXAMPLE 8

*17aβ - vinyl - D - homoetiocholane - 3α,17aα - diol - 11 - one:*

The mother liquors from the recrystallization of 3α-acetoxy - 17aβ - vinyl - D - homoetiocholan - 17aα - ol - 11 - one, obtained above in Example 7, were concentrated to dryness. To the residue was added a solution of 2.0 g. of potassium carbonate in 20 ml. of water and 80 ml. of methanol, and the mixture was refluxed for one hour. Most of the methanol was removed in vacuo, the solution was diluted with water, and the solid product which separated was collected by filtration and recrystallized twice from ethyl acetate, giving 17aβ - vinyl - D - homoetiocholane - 3α,17aα - diol - 11 - one, M. P. 223–226° C., $[\alpha]_D^{25}=-1.74°$ (1% in chloroform). This compound differs from the compound prepared in Example 5 in the configuration of the groups in the 17a-position.

*Analysis.*—Calcd. for $C_{22}H_{34}O_3$: C, 76.25; H, 9.89. Found: C, 75.93; H, 9.71.

EXAMPLE 9

*17aα - ethyl - D - homoetiocholane - 3α,17aβ - diol - 11 - one* (I; R is H, Y is —CH₂CH₂—, X is

X' is O):

A mixture of 4.0 g. of 17aα - ethynyl - D - homoetiocholane - 3α,17aβ - diol - 11 - one, obtained as described above in Example 1, 500 mg. of platinum oxide catalyst and 150 ml. of absolute ethanol was shaken in a hydrogen atmosphere at a pressure of 40 lbs. per sq. inch at room temperature. After the uptake of hydrogen had ceased, the catalyst was removed by filtration, the filtrate was concentrated in vacuo to a small volume and water was added. The solid product which separated was collected by filtration and dried at 70° C., giving 3.7 g. of 17aα - ethyl - D - homoetiocholane - 3α,17aβ - diol - 11 - one (D - homo - pregnane - 3α,17aβ - diol - 11 - one), M. P. 182–183° C. Recrystallizing from ethyl acetate and drying at 110° C. for eight hours in a vacuum oven gave a sample with the M. P. 184–186° C., $[\alpha]_D^{25}=+31.1°$ (1% in chloroform).

*Analysis.*—Calcd. for $C_{22}H_{36}O_3$: C, 75.81; H, 10.41. Found: C, 76.06; H, 10.73.

EXAMPLE 10

*3α-acetoxy-17aα-ethyl-D-homoetiocholan-17aβ - ol - 11-one* (I; R is H, Y is —CH₂CH₂—, X is

X' is O) was prepared by hydrogenation of 3.87 g. of 3α-acetoxy-17aα-ethynyl-D-homoetiocholan - 17aβ - ol-11-one in 150 ml. of ethyl acetate in the presence of 500 mg. of platinum oxide catalyst according to the manipulative procedure described above in Example 9. There was obtained 3.91 g. of 3α-acetoxy-17aα-ethyl-D-homoetiocholan-17aβ-ol-11-one (3α-acetoxy-D-homopregnan-17aβ-ol-11-one), M. P. 204–206° C. which when recrystallized from petroleum ether (Skellysolve B) and then from methanol and dried at 100° C. in a vacuum oven for eight hours had the M. P. 207.5–210° C., $$[\alpha]_D^{25}=+56.0°$$

(1% in chloroform).

*Analysis.*—Calcd. for $C_{24}H_{38}O_4$: C, 73.80; H, 9.81. Found: C, 74.20; H, 9.50.

EXAMPLE 11

*3α-acetoxy-17aβ-ethyl-D-homoetiocholan - 17aα-ol - 11-one:*

3α-acetoxy-17aβ-ethynyl-D-homoetiocholan-17aα-ol-11-one (1.2 g.), prepared as described above in Example 3, was hydrogenated in 150 ml. of ethyl acetate in the presence of 300 mg. of platinum oxide catalyst according to the manipulative procedure described above in Example 9. The solid product was recrystallized first from an ethyl acetate-petroleum ether (Skellysolve B) mixture and then from petroleum ether (Skellysolve C) and dried at 100° C. for eight hours in a vacuum oven, giving 3α-acetoxy-17aβ-ethyl-D-homoetiocholan-17aα-ol-11-one, M. P. 207.5–211° C., $[α]_D^{25}=+53.9°$ (1% in chloroform). This compound differs from the compound obtained in Example 10 in the configuration of the groups in the 17a-position.

*Analysis.*—Calcd. for $C_{24}H_{38}O_4$: C, 73.80; H, 9.81. Found: C, 73.78; H, 9.97.

EXAMPLE 12

*17aβ-ethyl-D-homoetiocholane-3α,17aα-11-one:*

A mixture of 500 mg. of 3α-acetoxy-17aβ-ethyl-D-homoetiocholan-17aα-ol-11-one, obtained as described above in Example 11, and 1.0 g. of potassium carbonate in 50 ml. of methanol and 10 ml. of water was refluxed for one and one-half hours. The reaction mixture was concentrated to a small volume, diluted with water, and the solid product which separated was collected by filtration, dried, recrystallized from an ethyl acetate-petroleum ether (Skellysolve C) mixture and dried at 100° C. for eight hours in a vacuum oven, giving 17aβ-ethyl-D-homoetiocholane-3α,17aα-diol-11-one, M. P. 149–150.5° C., $[α]_D^{25}=+30.1°$ (1% in chloroform). This compound differs from the compound obtained in Example 9 in the configuration of the groups in the 17a-position.

*Analysis.*—Calcd. for $C_{22}H_{36}O_3$: C, 75.81; H, 10.41. Found: C, 76.02; H, 10.10.

EXAMPLE 13

*17aα-ethyl-D-homoetiocholan-17aβ-ol-3,11-dione* (I; R is H, Y is —CH₂CH₂—, X is O, X' is O):

Chromic oxide (2.0 g.) was added in three portions to 20 ml. of pyridine at 10° C., and the mixture was stirred for ten minutes. A solution of 2.5 g. of 17aα-ethyl-D-homoetiocholane-3α,17aβ-diol-11-one in 15 ml. of pyridine was then added at room temperature, and the mixture was stirred for two hours and allowed to stand for about fifteen hours. The mixture was extracted with a mixture of equal volumes of ethyl acetate and ether, and the extracts were washed with dilute sulfuric acid and then with sodium bicarbonate solution and dried over anhydrous sodium sulfate. Concentration of the extracts gave a crystalline residue (2.4 g.) with the M. P. 182–183.5° C. The product was recrystallized twice from an ethyl acetate-petroleum ether (Skellysolve C) mixture and dried at 105° C. for eight hours in a vacuum oven, giving 17aα-ethyl-D-homoetiocholan-17aβ-ol-3,11-dione (D-homopregnan-17aβ-ol-3,11-dione), M. P. 183.5–186.5° C., $[α]_D^{25}=+41.15°$ (1% in chloroform).

*Analysis.*—Calcd. for $C_{22}H_{34}O_3$: C, 76.25; H, 9.89. Found: C, 76.00; H, 9.60.

EXAMPLE 14

*17aα-ethynyl-D-homoetiocholan-17aβ-ol-3,11-dione* (I; R is H, Y is —C≡C—, X is O, X' is O):

A solution of 5.0 g. of 17aα-ethynyl-D-homoetiocholane-3α,17aβ-diol-11-one and 50 ml. of cyclohexanone in 500 ml. of dry toluene was heated in an apparatus protected from moisture and set up for downward distillation. Heating was continued until 100 ml. of distillate had been taken off, and then, while maintaining distillation at a rate of about one drop per second, a solution of 5.0 g. of aluminum isopropoxide in 200 ml. of dry toluene was added during a period of forty-five minutes. Distillation was continued until the volatile materials had been removed, and the residue was steam distilled for three and one-half hours. To the non-volatile material there was then added 50 ml. of 6 N sulfuric acid followed by ethyl acetate. The mixture was shaken and the ethyl acetate layer was separated, washed with water and dried over anhydrous sodium sulfate. Petroleum ether was then added to the extracts, the solution was concentrated, and the material which crystallized was collected by filtration, giving 4.2 g., M. P. 196–200° C. with softening at 189° C. This material was dissolved in petroleum ether (Skellysolve C) and chromatographed on a column containing 200 g. of silica gel. The material eluted with a mixture of equal volumes of ether and petroleum ether (Skellysolve A) was recrystallized from ethyl acetate. The product thus obtained, M. P. 217–221° C., was rechromatographed in the same manner, recrystallized first from an ethyl acetate-petroleum ether (Skellysolve C) mixture and then from ethyl acetate alone and dried at 100° C. for eight hours in a vacuum oven, giving 17aα-ethynyl-D-homoetiocholan-17aβ-ol-3,11-dione (D-homo-20-pregnyn-17aβ-ol-3,11-dione), M. P. 221–225° C., $[α]_D^{25}=+12°$ (1% in chloroform).

*Analysis.*—Calcd. for $C_{22}H_{30}O_3$: C, 77.15; H, 8.83. Found: C, 77.42; H, 8.57.

EXAMPLE 15

*17a-ethynyl-D-homoetiocholane-3α,11β,17a - triol* (D-homo-20-pregnyne-3α,11β,17a-triol) (II; R is H, X' is

R' is H) can be prepared by reacting D-homoetiocholane-3α,11β-diol-17a-one, M. P. 160–162° C., with potassium acetylide followed by hydrolysis, according to the manipulative procedure described in Example 1.

EXAMPLE 16

*3α,11α - diacetoxy - 17a - ethynyl - D - homoetiocholan-17a-ol* (3α,11α-diacetoxy-D-homo-20-pregnyn-17a-ol) (II; R is H, X' is

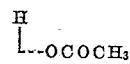

R' is CH₃CO—) can be prepared by reacting 3α,11α-diacetoxy-D-homoetiocholan-17a-one, M. P. 173–176° C., with potassium acetylide followed by hydrolysis, according to the manipulative procedure described in Example 1.

EXAMPLE 17

*3α - acetoxy - 17a - (3 - acetoxy - 1 - propynyl) - D-homoetiocholan-17a-ol-11-one* (II; R is —CH₂OCOCH₃, X' is O, R' is CH₃CO—):

Propargyl alcohol (HC≡CCH₂OH) (15.5 g.) was added to a solution of potassium tertiary-butoxide, prepared from 9.0 g. of potassium and 250 ml. of anhydrous tertiary-butyl alcohol, with stirring under a nitrogen atmosphere. The mixture was stirred for ten minutes, and then there was added 11.0 g. of D-homoetiocholan-3α-ol-11,17a-dione. The reaction mixture was stirred at room temperature for five hours, allowed to stand for thirty-six hours and then added to 1.5 liters of water. The aqueous mixture was made acid with dilute hydrochloric acid, then neutralized with sodium bicarbonate, concentrated somewhat in vacuo to remove most of the tertiary-butyl alcohol and diluted to a volume of 2 liters with water. The solid material thus formed was collected by filtration, giving 13.9 g. of a mixture of starting material and 17a-(3-hydroxy-1-propynyl)-D-homoetiocholane-3α,17a-diol-11-one (II; R is —CH₂OH, X' is O, R' is H), M. P. 204–210° C. The mixture was recrystallized from methanol giving 8.9 g., M. P. 194–224° C. The recrystallized material was acetylated by heating with 50 ml. of acetic anhydride and 25 ml. of pyridine for one-half hour, adding the mixture to water, and filtering and drying the product at 70° C., giving a solid, M. P. 121–135° C. (liquid clearing at 155° C.). The solid was dissolved in portions in solvent comprising 10% ether and 90% petroleum ether (Skellysolve A) and adsorbed on a column of 250 g. of silica gel. The column was eluted with ether-petroleum ether mixtures containing gradually increasing proportions of ether. Solvent containing 40% ether brought out the starting material, D-homoetiocholan-3α-ol-11,17a-dione, M. P. 166–168° C. Solvent containing 50% ether brought out 3α - acetoxy - 17a - (3 - acetoxy - 1 - propynyl) - D-homoetiocholan-17a-ol-11-one, M. P. 188–191° C. The latter compound when recrystallized from a small volume of ethanol and dried at 100° C. in vacuo for seven hours had the M. P. 192–193° C., $[\alpha]_D^{25} = +13.4°$ (1% in chloroform).

*Analysis.*—Calcd. for $C_{27}H_{38}O_6$: C, 70.71; H, 8.35. Found: C, 70.99; H, 8.66.

EXAMPLE 18

*17a - (3-hydroxy - 1 - propynyl) - D - homoetiocholane-3α,17a-diol-11-one (II; R is —CH₂OH, X' is O, R' is H):*

About 5 g. of 3α-acetoxy-17a-(3-acetoxy-1-propynyl)-D-homoetiocholan-17a-ol-11-one (Example 17) was dissolved in 150 ml. of methanol, 5 g. of potassium carbonate in 35 ml. of water was added, and the mixture was refluxed for one and one-half hours. The methanol was removed in vacuo, the residue was stirred with water, and the solid product was collected by filtration, washed well with water and dried at 70° C., giving 3.5 g., M. P. 225–233° C. The latter was recrystallized twice from ethyl acetate, and a sample was dried at 100° C. in a vacuum oven for eight hours, giving 17a-(3-hydroxy-1-propynyl)-D-homoetiocholane-3α,17a-diol-11-one, M. P. 245–252.5° C., $[\alpha]_D^{25} = -15.9°$ (1% in acetone).

*Analysis.*—Calcd. for $C_{23}H_{34}O_4$: C, 73.76; H, 9.15. Found: C, 73.54; H, 8.98.

EXAMPLE 19

(a) *3α - acetoxy - D - homoetiocholane - 11,17a - dione 17a-ethylene ketal:*

A mixture of 25.0 g. of 3α-acetoxy-D-homoetiocholane-11,17a-dione, 25.0 ml. of redistilled ethylene glycol, 1.0 g. of p-toluenesulfonic acid monohydrate and 5.0 ml. of benzene was refluxed under a water trap for seven and one-half hours. The reaction mixture was cooled, 2 ml. of pyridine was added and the solution was washed twice with water, dried over anhydrous sodium sulfate and concentrated to dryness in vacuo. The residue was crystallized from petroleum ether (Skellysolve C) and then recrystallized from 400 ml. of methanol containing four drops of pyridine. Two crops of 3α-acetoxy-D-homoetiocholane-11,17a-dione 17a-ethylene ketal were obtained, 13.6 g., M. P. 208–210° C. and 3.8 g., M. P. 197–200° C.

(b) *3α,11α-diacetoxy - D - homoetiocholan - 17a - one 17a-ethylene ketal:*

3α - acetoxy - D - homoetiocholane - 11,17a - dione 17a-ethylene ketal (17.4 g.) was dissolved in 2000 ml. of n-propanol with the aid of heat. The solution was cooled and 184 g. of sodium metal was added in small pieces but as rapidly as possible. When most of the sodium had dissolved the solution was heated under reflux until sodium propoxide began to separate. There was then carefully added methanol followed by water to dissolve the excess sodium and the sodium propoxide. The mixture was concentrated in vacuo to a small volume, diluted with ice water and extracted twice with methylene dichloride. The methylene dichloride extracts were dried over anhydrous sodium sulfate and concentrated. The residue was taken up in a mixture of 100 ml. of anhydrous pyridine and 100 ml. of 90–95% acetic anhydride and heated on a steam bath for one hour. The reaction mixture was concentrated in vacuo to a residual volume of 25 ml., 25 ml. of pyridine was added, and the mixture was poured into ice water. A gum separated which rapidly crystallized and was collected by filtration, washed with water and dried at 70° C. The resulting product (weight 20.0 g.) was recrystallized twice from absolute alcohol containing a few drops of pyridine and dried at 70° C., giving 14.0 g. of 3α,11α-diacetoxy-D-homoetiocholan-17a-one 17a-ethylene ketal, M. P. 206–208° C.

(c) *3α,11α-diacetoxy-D-homoetiocholan-17a-one:*

A mixture of 14.0 g. of 3α,11α-diacetoxy-D-homoetiocholan-17a-one 17a-ethylene ketal and 100 ml. of 80% acetic acid was heated on a steam bath for one and one-half hours. The reaction mixture was poured into 1 liter of water, and the resulting gum which crystallized was collected by filtration, washed well with water and dried at 70° C., giving 12.6 g. of 3α,11α-diacetoxy-D-homoetiocholan-17a-one, M. P. 157–164° C.

(d) *11α-acetoxy-D-homoetiocholan-3α-ol-17a-one:*

The 3α,11α-diacetoxy-D-homoetiocholan-17a-one, obtained above in part (c), was dissolved in 300 ml. of methanol, 9.0 g. of potassium carbonate in 50 ml. of water was added, and the mixture was refluxed on a steam bath for one hour. The reaction mixture was concentrated in vacuo, the residue was stirred with water, and the resulting crystalline material was collected by filtration, washed with water and dried at 70° C. The product was recrystallized twice from ethyl acetate, and a sample was dried at 110° C. in a vacuum oven for eight hours, giving 11α-acetoxy-D-homoetiocholan-3α-ol-17a-one, M. P. 167–168.5° C., $[\alpha]_D^{25} = -70.9°$ (1% in chloroform).

*Analysis.*—Calcd. for $C_{22}H_{34}O_4$: C, 72.87; H, 9.45. Found: C, 72.94; H, 9.31.

(e) *17aα-ethynyl-D-homoetiocholane-3α,11α,17aβ-triol (II; R is H, X' is*

*R' is H)* was prepared from 11.0 g. of 11α-acetoxy-D-homoetiocholan-3α-ol-17a-one, 7.70 g. of potassium metal and acetylene in tertiary-butyl alcohol solution according to the manipulative procedure described above in Example 1. The total crude product containing 11α-acetoxy-17aα-ethynyl - D - homoetiocholane-3α,17aβ-diol was dissolved in 200 cc. of methanol, 7.0 g. of potassium hydroxide was added and the solution was refluxed for one hour. The solvent was removed by distillation at reduced pressure, 200 cc. of water was added, and the solid material which separated was collected by filtration, washed well with water and dried at 70° C., giving 10.25 g. of 17aα-ethynyl-D-homoetiocholane-3α,11α,17aβ-triol, M. P. 195–210° C.

(f) *3α,11α-diacetoxy-17aα-ethynyl-D-homoetiocholan-17aβ-ol (II; R' is H, X' is*

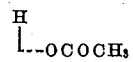

*R' is CH₃CO—):*

A mixture of 10.25 g. of 17aα-ethynyl-D-homoetiocholane-3α,11α,17aβ-triol, 20 cc. of pyridine and 10 cc. of acetic anhydride was heated on a steam bath for one and one-half hours. The reaction mixture was cooled, poured into 1 liter of water, and the solid material which separated was collected by filtration, washed well with water and dried at 70° C., giving 12.33 g. of product, M. P. 195–210° C. The latter was dissolved in petroleum ether (Skellysolve A) and chromatographed on a column of 400 g. of silica gel. The column was eluted with petroleum ether containing gradually increasing proportions of ether. The material brought out by eluant containing 40% ether was combined and recrystallized twice from a benzene-petroleum ether (Skellysolve B) mixture, giving 6.6 g. of 3α,11α-diacetoxy-17aα-ethynyl-D-homoetiocholan-17aβ-ol, M. P. 222–224° C., $[\alpha]_D^{25} = -43.8°$ (1% in chloroform).

Analysis.—Calcd. for C$_{26}$H$_{38}$O$_5$: C, 72.52; H, 8.90. Found: C, 72.39; H, 8.69.

EXAMPLE 20

*3α-11α-diacetoxy-17aα-vinyl - D-homoetiocholan-17aβ-ol* (I; R is H, Y is —CH=CH—, X is

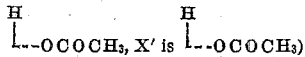

—OCOCH$_3$, X' is L—OCOCH$_3$)

was prepared by reduction of 4.3 g. of 3α,11α-diacetoxy-17aα-ethynyl-D-homoetiocholan-17aβ-ol with 2.0 g. of 2% platinum hydroxide on strontium carbonate catalyst in 200 cc. of pyridine according to the manipulative procedure described above in Example 5. The crude product, M. P. 155–156° C., was recrystallized twice from petroleum ether (Skellysolve C), giving 3.77 g. of 3α,11α-diacetoxy-17aα-vinyl - D - homoetiocholan-17aβ-ol, M. P. 171–175° C., [α]$_D^{25}$=—2.2° (1% in chloroform).

Analysis.—Calcd. for C$_{26}$H$_{40}$O$_5$: C, 72.19; H, 9.32. Found: C, 71.81; H, 9.31.

EXAMPLE 21

*3α,11α-diacetoxy-17aα-ethyl - D-homoetiocholan-17aβ-ol* (I; R is H, Y is —CH$_2$CH$_2$—, X is

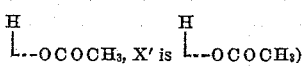

—OCOCH$_3$, X' is L—OCOCH$_3$)

was prepared by reduction of a mixture of 2.24 g. of 3α,11α-diacetoxy-17aα-ethynyl-D-homoetiocholan-17aβ-ol and 1.50 g. of 3α,11α-diacetoxy-17aα-vinyl-D-homoetiocholan-17aβ-ol with 0.1 g. of platinum oxide catalyst in 200 cc. of methanol according to the manipulative procedure described above in Example 9. The resulting product was recrystallized twice from petroleum ether (Skellysolve C), giving 3.1 g. of 3α,11α-diacetoxy-17aα-ethyl-D-homoetiocholan-17aβ-ol, M. P. 197–200° C., [α]$_D^{23.8}$=—3.0° (1% in chloroform).

Analysis.—Calcd. for C$_{26}$H$_{42}$O$_5$: C, 71.85; H, 9.74. Found: C, 72.12; H, 9.65.

EXAMPLE 22

(a) *3α-acetoxy-D-homoetiocholan-11β-ol-17a-one*:

A mixture of about 20 g. of D-homoetiocholane-3α,11β-diol-17a-one, 50 cc. of pyridine and 25 cc. of acetic anhydride was heated for one hour on a steam bath. The reaction mixture was poured into 1 liter of ice water, and the solid product was collected by filtration, washed with water and recrystallized three times from methanol containing about 12% of water, giving 13.3 g. of 3α-acetoxy - D - homoetiocholan - 11β - ol - 17a - one, M. P. 159–160° C.

(b) *17aα-ethynyl-D-homoetiocholane-3α,11β,17aβ-triol* (II; R is H, X' is

—OH

R' is H) was prepared from 22.0 g. of 3α-acetoxy-D-homoetiocholan-11β-ol-17a-one, 7.7 g. of potassium metal and acetylene in tertiary butyl alcohol solution according to the manipulative procedure described above in Example 1. After the addition of acetylene was complete, 100 cc. of water was added to the reaction mixture which was then heated for one hour on a steam bath. Most of the solvent was removed by distillation in vacuo, 800 cc. of water was added to the residue, and the solid material which separated was collected by filtration, washed with water and dried at 70° C. The aqueous filtrate was extracted twice with 200 cc. of methylene dichloride, and the methylene dichloride was removed by distillation in vacuo. The residue was combined with the solid product, and the resulting 17aα-ethynyl-D-homoetiocholan-3α,11β,17aβ-triol was acetylated as described below.

(c) *3α-acetoxy-17aα-ethynyl-D-homoetiocholane-11β,17aβ-diol* (II; R is H, X' is

—OH

R' is CH$_3$CO—):

The 17aα-ethynyl-D-homoetiocholane-3α,11β,17aβ-*triol* obtained above in part (b) was heated for one hour on a steam bath with 40 cc. of pyridine and 20 cc. of acetic anhydride. The reaction mixture was poured into 1 liter of ice water, and the solid product which separated was collected by filtration, washed with water and dried at 70° C. The product was further dried by dissolving it in methanol, adding 200 cc. of benzene and removing the solvent by distillation in vacuo. The residue was dissolved in 100 cc. of ether, 900 cc. of petroleum ether (Skellysolve A) was added, and the solution was chromatographed on a column of 900 g. of silica gel. The column was eluted with ether-petroleum ether mixtures of gradually increasing ether content. Eluant containing 40% ether first brought out 1.6 g. of crystalline material, M. P. 129–142° C., followed by 5.97 g. of crystalline material, M. P. 191–203° C. The material melting at 191–203° C. was recrystallized twice from benzene, giving 5.27 g. of 3α-acetoxy-17aα-ethynyl-D-homoetiocholane-11β,17aβ-diol, M. P. 202.5–205° C., [α]$_D^{24}$=+31.7° (1% in chloroform).

Analysis.—Calcd. for C$_{24}$H$_{36}$O$_4$: C, 74.19; H, 9.34. Found: C, 74.31; H, 9.60.

EXAMPLE 23

*3α-acetoxy-17aβ-ethynyl-D-homoetiocholane-11β,17aα-diol*:

The 1.60 g. of material having the M. P. 129–142° C., obtained by chromatographic separation of the mixture of products obtained in Example 22, part (c), was recrystallized from petroleum ether (Skellysolve C), giving 1.23 g. of 3α-acetoxy-17aβ-ethynyl-D-homoetiocholane-11β,17aα-diol, M. P. 165–166.5° C. with partial melting at 147° C., [α]$_D^{24}$=+12.5° (1% in chloroform).

Analysis.—Calcd. for C$_{24}$H$_{36}$O$_4$: C, 74.19; H, 9.34. Found: C, 74.22; H, 9.59.

EXAMPLE 24

*3α-acetoxy-17aα-vinyl - D - homoetiocholane-11β,17aβ-diol* (I; R is H, Y is —CH=CH—, X is

—OCOCH$_3$, X' is L—OH)

was prepared by reduction of 3.38 g. of 3α-acetoxy-17aα-ethynyl-D-homoetiocholane-11β,17aβ-diol with 2.0 g. of 2% palladium hydroxide on strontium carbonate catalyst in 200 cc. of pyridine according to the manipulative procedure described above in Example 5. The product was recrystallized from ethyl acetate, giving 2.38 g. of 3α-acetoxy-17aα-vinyl-D - homoetiocholane-11β,17aβ-diol, M. P. 165.5–168° C., [α]$_D^{23}$=+63.3° (1% in chloroform).

Analysis.—Calcd. for C$_{24}$H$_{38}$O$_4$: C, 73.75; H, 9.74. Found: C, 73.88; H, 10.00.

EXAMPLE 25

*3α-acetoxy-17aα-ethyl - D - homoetiocholane-11β,17aβ-diol* (I; R is H, Y is —CH$_2$CH$_2$—, X is

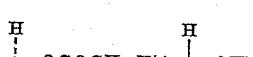

—OCOCH$_3$, X' is L—OH)

was prepared by reduction of about 2.4 g. of 3α-acetoxy-17aα-vinyl-D-homoetiocholane-11β,17aβ-diol with 0.1 g. of platinum oxide catalyst in 200 cc. of methanol according to the manipulative procedure described above in Example 9. The product was recrystallized twice from benzene giving 1.15 g. of 3α-acetoxy-17aα-ethyl-D-homo-etiocholane-11β,17aβ-diol, M. P. 194–197.5° C., $$[\alpha]_D^{23} = +54.5°$$

(1% in chloroform).

Analysis.—Calcd. for $C_{24}H_{40}O_4$: C, 73.43; H, 10.27. Found: C, 73.30; H, 10.26.

EXAMPLE 26

3α,17aβ-diacetoxy-17aα-ethynyl-D-homoetiocholan-11-one (I; R is H, Y is —C≡C—, R' is CH₃CO—, X' is O, X is

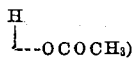

A mixture of 40.0 g. of 17aα-ethynyl-D-homoetiocholane-3α,17aβ-diol-11-one (Example 1), 300 ml. of 90–95% acetic anhydride, 45 g. of p-toluenesulfonic acid monohydrate and 500 ml. of acetic acid was kept for four days at room temperature. The reaction mixture was then added to 12 liters of water, allowed to stand for 1.5 hours, and the solid product was collected by filtration, dried at 70° C., recrystallized first from an ethyl acetate-petroleum ether (Skellysolve C) mixture, then from methanol, and again from ethyl acetate-petroleum ether, giving 41.2 g. of 3α,17aβ-diacetoxy-17aα-ethynyl-D-homoetiocholan-11-one, M. P. 203–204° C., followed by resolidification and again melting at 215–216° C. A pure sample of the compound had the M. P. 205.5–207.5° C. with resolidification and remelting at 214.5–217.5° C. (corr.), $[\alpha]_D^{23.8} = +5.6°$ (1% in chloroform).

Analysis.—Calcd. for $C_{26}H_{36}O_5$: C, 72.86; H, 8.47. Found: C, 72.71; H, 8.19.

Similarly starting from 2.0 g. of 17aβ-ethynyl-D-homoetiocholane-3α,17aα-diol-11-one (Example 4) there was prepared the stereoisomeric 3α,17aα-diacetoxy-17aβ-ethynyl-D-homoetiocholan-11-one, M. P. 204.5–205.5° C., $[\alpha]_D^{24} = +69.9°$ (1% in chloroform).

Analysis.—Calcd. for $C_{26}H_{36}O_5$; C, 72.86; H, 8.47. Found: C, 72.64; H, 8.34.

EXAMPLE 27

3α-acetoxy-17aα-ethyl-D-homoetiocholan-17aβ-ol-11-one (I; R is H, Y is —CH₂CH₂—

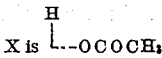

X' is O):

A 20 ml. portion of a solution of 129 g. of ethyl bromide in 200 ml. of tetrahydrofuran was added to a suspension of magnesium in 800 ml. of tetrahydrofuran containing a trace of iodine. After the iodine color had disappeared (about ten minutes) the remainder of the solution of ethyl bromide was added dropwise over a period of sixty minutes while cooling the reaction mixture in an ice bath. The reaction mixture was stirred for one-half hour at 0° C. and for three and one-half hours at room temperature. To this solution was added dropwise over a period of thirty minutes a solution of 18.0 g. of 3α-acetoxy-D-homoetiocholane-11,17a-dione in 250 ml. of dry tetrahydrofuran, and the mixture was refluxed with stirring for eighteen hours. The solution was then cooled in ice, and 250 ml. of saturated ammonium chloride solution was slowly added followed by 250 ml. of water. The tetrahydrofuran was removed by distillation in vacuo, and the aqueous residue was extracted three times with 150 ml. of methylene dichloride. The crystalline product which did not dissolve in the methylene dichloride was collected by filtration of the aqueous layer and dried at 70° C., giving 6.4 g. of reduction product, D-homoetiocholane-3α,17a-diol-11-one. The methylene dichloride extracts were washed with ammonium chloride solution and with dilute sodium chloride solution, dried over anhydrous sodium sulfate and concentrated. The residue was stirred with 75 ml. of absolute ether. The material which failed to dissolve in the ether was collected by filtration, giving an additional 2.0 g. of D-homoetiocholane-3α,17a-diol-11-one. The ether soluble material was dissolved in petroleum ether (Skellysolve B) containing 10% of benzene and the solution was chromatographed on a column of 300 g. of aluminum oxide prewet with petroleum ether. The column was eluted successively with petroleum ether containing gradually increasing proportions of benzene, pure benzene, benzene containing gradually increasing proportions of ether, pure ether, and ether containing gradually increasing proportions of acetone. The material brought out by eluants in the range from 40% ether in benzene to 50% acetone in ether was combined and acetylated with a mixture of 40 ml. of acetic anhydride and 25 ml. of pyridine. This mixture was allowed to stand at room temperature for about fifteen hours and then poured into 700 ml. of ice water. The resulting gum was extracted with methylene dichloride, and the methylene dichloride extracts were washed with dilute sulfuric acid and dilute sodium carbonate, dried over anhydrous sodium sulfate and concentrated to dryness. The residue was stirred with 80 ml. of absolute ether and the crystalline material was collected by filtration, washed with ether and dried at 70° C., giving 3α-acetoxy-17aα-ethyl-D-homoetiocholan-17aβ-ol-11-one, M. P. 198–204° C. A sample when recrystallized twice from ethyl acetate had the M. P. 208–209° C., and showed no depression in melting point when mixed with the product obtained in Example 10.

EXAMPLE 28

17aα-ethynyl-D-homoetiocholane-3α,17aβ-diol-11-one (II; R is H, X' is O, R' is H):

Lithium wire (2.1 g.) was dissolved in 500 ml. of tertiary butyl alcohol in a nitrogen atmosphere by refluxing and stirring. Upon cooling a precipitate of lithium tertiary-butoxide appeared. Acetylene gas (purified by passage through a train comprising a trap immersed in a Dry Ice-methylene dichloride mixture, a bottle containing concentrated sulfuric acid, and a soda-lime tower) was passed through the suspension for two hours at room temperature, then for one hour at reflux temperature, and for two hours while allowing the reaction mixture to cool. After standing for fifteen hours acetylene was again passed through the mixture at reflux temperature for forty-five minutes, 18.03 g. of 3α-acetoxy-D-homoetiocholane-11,17a-dione was added, and acetylene was passed through the mixture under reflux for one hour and then for six hours longer while the mixture was allowed to cool at room temperature. The reaction mixture was then poured into about 6 liters of water. The hydrolysis mixture was acidified with dilute hydrochloric acid and then neutralized with sodium bicarbonate. The aqueous mixture was concentrated to a 2 liter volume, diluted with ice water to 6 liters, and the solid product was collected by filtration, washed with water and dried at 70° C. The solid product was recrystallized twice from ethyl acetate, giving 17aα-ethynyl-D-homoetiocholane-3α,17aβ-diol-11-one, M. P. 225–227° C. There was no depression in melting point when mixed with the product obtained in Example 1.

EXAMPLE 29

17a-(1-propynyl)-D-homoetiocholane-3α,17a-diol-11-one (II; R is CH₃, X is O, R' is H) can be prepared by reacting D-homoetiocholan-3α-ol-11,17a-dione with potassium methylacetylide (KC≡CCH₃) followed by hydrolysis, according to the manipulative procedure described in Example 1, replacing the acetylene of that example with 1-propyne.

EXAMPLE 30

17a-(3-hydroxy-3-methyl-1-butynyl)-D-homoetiocholane-3α,17a-diol-11-one (II; R is —C(OH)(CH₃)₂, X' is O, R' is H) can be prepared by reacting D-homoetiocholan-3α-ol-11,17a-dione with the potassio derivative of 3- hydroxy-3-methyl-1-butyne [(CH₃)₂C(OH)C≡CH] followed by hydrolysis, according to the manipulative procedure described in Example 17.

EXAMPLE 31

*17a-(3-hydroxy-3-methyl-1-pentynyl)-D- homoetiocholane-3α,17a-diol-11-one* (II; R is

—C(OH)(CH₃)CH₂CH₃

X' is O, R' is H) can be prepared by reacting D-homoetiocholan-3α-ol-11,-17a-dione with the potassio derivative of 3-hydroxy-3-methyl-1-pentyne

[CH₃CH₂(CH₃)C(OH)C≡CH]

followed by hydrolysis, according to the manipulative procedure described in Example 17.

The compounds of the invention, as depicted by Formula I above, are useful as hormonal agents, and in particular possess anti-estrogenic and the like properties. For example, 17aα-ethynyl-D-homoetiocholane-3α, 17aβ-diol-11-one (Example 1) was found to exhibit 34.0% inhibition of estrogen at a dose of 5.0 mg./kg. of body weight per day over a period of three days when measured in female rats by determining the weight of the uteri of animals injected both with a standard dose of estradiol and a given amount of the new compound as compared with the weight of the uteri of animals injected only with the standard dose of estradiol. In higher doses, 17aα-ethynyl-D-homoetiocholane-3α,17aβ-diol-11-one showed progestational activity. No toxic manifestations were observed when 17aα-ethynyl-D-homoetiocholane-3α, 17aβ-diol-11-one was injected in dose levels of 1, 3 and 9 mg. per day to male rats over a three week period.

Similarly 17aα-ethyl-D-homoetiocholane-3α,17aβ-diol-11-one (Example 9) exhibited 23.5% inhibition of estrogen at a dose level of 10 mg/kg./day; 17aα-vinyl-D-homoeticholane-3α,17aβ-diol-11-one (Example 5) exhibited 30% inhibition of estrogen at a dose level of 10 mg./kg./day; and 17aα-ethyl-D-homoetiocholan-17aβ-ol-3,11-dione (Example 13) exhibited 35.8% inhibition of estrogen at a dose level of 5 mg./kg./day.

The compounds of the invention are also useful as starting materials in the preparation of other useful compounds. For example, the compounds having the ethynyl group in the 17a position can be transformed into compounds bearing the typical cortical hormone side chain, i. e., —COCH₂OH, and having that activity. The ethynyl group can be hydrated by reaction with acetic anhydride, mercuric ion and boron trifluoride, followed by hydrolysis, or with aniline, mercuric ion and water. The resulting acetyl group, —COCH₃, in the 17a position can then be halogenated in the 21-position and the halogen replaced by hydroxy or acyloxy by basic hydrolysis, giving the cortical hormone side chain. Compounds having other hormonal activities, e. g., anti-progestational and anti-androgenic activities, are encountered during these transformations. This subject matter is disclosed in my copending application, Serial No. 463,055, filed October 18, 1954.

The compounds of Formula I having a vinyl group in the 17a position are also useful as starting materials in the preparation of compounds bearing the cortical hormone side chain. Allylic rearrangement of a 17a-vinyl-17a-hydroxy compound by heating with a strong acid in the presence of acetic anhydride gives the corresponding Δ¹⁷ᵃ,²⁰-21-acyloxy compound, the side chain at 17a being =CHCH₂OCOCH₃. The latter possess cortisone-antagonizing properties, and can be further transformed into useful compounds having the cortical hormone side chain. For example, the Δ¹⁷ᵃ,²⁰-21-acetoxy compound can be reacted with osmium tetroxide in the presence of acetic anhydride to give a 20,21-diacetoxy compound bearing a hydroxy group in the 17aα-position. The 20- and 21-acetoxy groups can then be saponified and then selectively acetylated to give the 21-monoacetoxy derivative which can then be oxidized with chromic oxide to give the typical acetoxyacetyl cortical hormone side chain. This subject matter is disclosed in my copending application, Serial No. 463,056, filed October 18, 1954, now Patent No. 2,789,998.

This application is a continuation-in-part of my copending application, Serial No. 384,325, filed October 5, 1953, and now abandoned.

I claim:

1. A compound of the etiocholane series having the formula

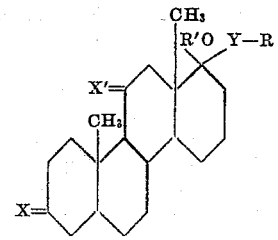

wherein Y is a member of the group consisting of —C≡C—, —CH=CH— and —CH₂CH₂— radicals, R is selected from the class consisting of hydrogen, lower-alkyl, and lower-alkyl substituted with R'O groups, R' is selected from the class consisting of hydrogen, lower-alkanoyl, carboxy-lower-alkanoyl and monocarbocyclic aroyl radicals, and X and X' are selected from the class consisting of

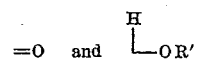

2. A compound of the etiocholane series having the formula

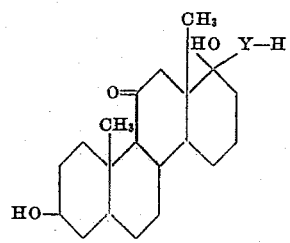

wherein Y is a member of the group consisting of —C≡C—, —CH=CH— and —CH₂CH₂— radicals.

3. A compound of the etiocholane series having the formula

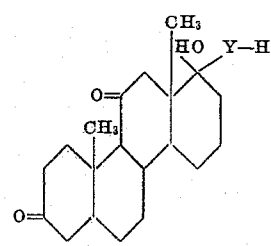

wherein Y is a member of the group consisting of —C≡C—, —CH=CH— and —CH₂CH₂— radicals.

4. A compound of the etiocholane series having the formula

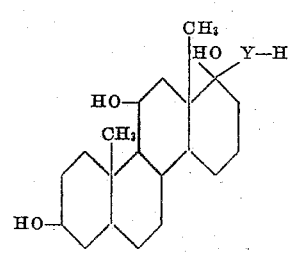

wherein Y is a member of the group consisting of —C≡C—, —CH=CH— and —CH₂CH₂— radicals.

5. A 17a - ethynyl - D - homoetiocholane - 3,17a - diol-11-one.

6. 17aα - ethynyl - D - homoetiocholane - 3,17aβ - diol-11-one.

7. A 3-acetoxy-17a-ethynyl-D-homoetiocholan-17a-ol-11-one.

8. 3α - acetoxy - 17aβ - ethynyl - D - homoetiocholan-17aα-ol-11-one.

9. A 17a-vinyl-D-homoetiocholane-3,17a-diol-11-one.

10. 17aα-vinyl-D-homoetiocholane-3,17aβ-diol-11-one.

11. A 17a-ethyl-D-homoetiocholane-3,17a-diol-11-one.

12. 17aα - ethyl - D - homoetiocholane - 3α,17aβ - diol-11-one.

13. A 17a-ethyl-D-homoetiocholan-17a-ol-3,11-dione.

14. 17aα - ethyl - D - homoetiocholan - 17aβ - ol - 3,11-dione.

15. A 17a - (3 - hydroxy - 1 - propynyl) - D - homoetiocholane-3,17a-diol-11-one.

16. The process for preparing 17a-ethynyl-D-homoetiocholane-3,17a-diol-11-one, which comprises reacting D-homoetiocholan-3-ol-11,17a-dione with a compound having the formula HC≡CM, wherein M is an alkali metal.

17. The process for preparing 17aα-ethynyl-D-homoetiocholane-3α,17aβ-diol-11-one, which comprises reacting D-homoetiocholane-3α,17a-dione with a compound having the formula HC≡CM, wherein M is an alkali metal, and separating the stereoisomers thus formed.

18. 17aα - ethylnyl - D - homoetiocholan - 17aβ - ol-3,11-dione.

19. 3α,11α - diacetoxy - 17aα - ethynyl - D - homoetiocholan-17aβ-ol.

20. 3α,11α - diacetoxy - 17aα - vinyl - D - homoetiocholan-17aβ-ol.

21. 3α,11α - diacetoxy - 17aα - ethyl - D - homoetiocholan-17aβ-ol.

22. 3α - acetoxy - 17aα - ethynyl - D - homoetiocholane-11β,17aβ-diol.

23. 3α - acetoxy - 17aβ - ethynyl - D - homoetiocholane-11β,17aα-diol.

24. 3α - acetoxy - 17aα - vinyl - D - homoetiocholane-11β,17aβ-diol.

25. 3α - acetoxy - 17aα - ethyl - D - homoetiocholane-11β,17aβ-diol.

References Cited in the file of this patent
UNITED STATES PATENTS 2,351,637    Ruzicka et al. _____ June 20, 1944

UNITED STATES PATENT OFFICE
Certificate of Correction

Patent No. 2,822,382                                       February 4, 1958

Raymond O. Clinton

It is hereby certified that error appears in the printed specification of the above numbered patent requiring correction and that the said Letters Patent should read as corrected below.

Column 4, line 39, for "M. P. 202–207° C." read —M. P. 205–207° C.—; column 7, line 23, for "*17aβ-ethyl-D-homoetiocholane-3α,17aα-11-one*" read —*17aβ-ethyl-D-homoetiocholane-3α,17aα-diol-11-one*—; column 18, line 3, for "17aα-ethylnyl-" read —17aα-ethynyl- —.

Signed and sealed this 15th day of April 1958.

[SEAL]

Attest:
KARL H. AXLINE,
*Attesting Officer.*

ROBERT C. WATSON,
*Commissioner of Patents.*